US009606953B2

(12) United States Patent
Talmola (10) Patent No.: US 9,606,953 B2
(45) Date of Patent: Mar. 28, 2017

(54) METHOD, APPARATUS, AND COMPUTER PROGRAM PRODUCT FOR ENTERING ACCESSORY DOCKING MODE IN USB TYPE C

(71) Applicant: Nokia Corporation, Espoo (FI)

(72) Inventor: Pekka Heikki Kalervo Talmola, Turku (FI)

(73) Assignee: Nokia Technologies Oy, Espoo (FI)

( * ) Notice: Subject to any disclaimer, the term of this patent is extended or adjusted under 35 U.S.C. 154(b) by 483 days.

(21) Appl. No.: 14/208,654

(22) Filed: Mar. 13, 2014

(65) Prior Publication Data

US 2015/0261714 A1   Sep. 17, 2015

(51) Int. Cl.
    G06F 13/40    (2006.01)
    G06F 3/06     (2006.01)

(52) U.S. Cl.
    CPC ...... *G06F 13/4081* (2013.01); *G06F 13/4022* (2013.01); *G06F 13/4068* (2013.01)

(58) Field of Classification Search
    None
    See application file for complete search history.

(56) References Cited

U.S. PATENT DOCUMENTS

| | | | |
|---|---|---|---|
| 5,884,086 A | 3/1999 | Amoni et al. |
| 5,919,253 A | 7/1999 | Schneider |
| 6,665,801 B1 | 12/2003 | Weiss |
| 7,340,627 B1 | 3/2008 | Harvey |
| 2001/0013075 A1 | 8/2001 | Otsuka et al. |
| 2002/0169915 A1 | 11/2002 | Wu |
| 2005/0001179 A1 | 1/2005 | Gisler et al. |
| 2007/0167069 A1 | 7/2007 | Murakami |
| 2007/0241769 A1 | 10/2007 | Song et al. |
| 2008/0126594 A1 | 5/2008 | Monks et al. |

(Continued)

OTHER PUBLICATIONS

USB Type C specification, USB.org, http://www.usb.org/developers/usbtypec/; version 1.0.*

(Continued)

*Primary Examiner* — Scott Sun
(74) *Attorney, Agent, or Firm* — Locke Lord LLP (57) ABSTRACT

Method, apparatus, and computer program product embodiments of the invention are disclosed for entering an accessory docking mode. In example embodiments of the invention, a method comprises: determining by a host, an orientation of a device or cable connector of a device, to a host connector of the host, based on whether a first configuration channel terminal or a second configuration channel terminal of the host connector is connected to a terminal of the device or cable connector that is connected through a resistance to a reference potential; causing by the host, a source voltage to be output on a source voltage output terminal of the host connector to a voltage input terminal of the device or cable connector, after the determination that a terminal of the device or cable connector is connected through a resistance to a reference potential; and determining by the host, whether the device is an audio headset, based on whether the terminal of the device or cable connector transitions to the reference potential in response to the source voltage output on the source voltage output terminal.

18 Claims, 6 Drawing Sheets

(56) References Cited

U.S. PATENT DOCUMENTS

| | | |
|---|---|---|
| 2008/0178011 A1 | 7/2008 | Hubo et al. |
| 2008/0215765 A1 | 9/2008 | Butler et al. |
| 2008/0314979 A1 | 12/2008 | Johnsen et al. |
| 2009/0209131 A1 | 8/2009 | Murphy et al. |
| 2010/0299449 A1 | 11/2010 | Terlizzi |
| 2010/0313226 A1 | 12/2010 | Cholas et al. |
| 2011/0208980 A1 | 8/2011 | Brooks et al. |
| 2011/0316838 A1* | 12/2011 | Ahn .................... G09G 3/3225 345/211 |
| 2012/0078690 A1 | 3/2012 | Harriman et al. |

OTHER PUBLICATIONS

International Search Report and Written Opinion for Application No. PCT/FI2015/050110 issued on May 27, 2015.
USB Type-C Cable and Connector Specification Revision 1.0, Aug. 11, 2014.

* cited by examiner

CONNECTOR 140

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | RFU1 | VBUS | RX2− | RX2+ | GND |
| GND | RX1+ | RX1− | VBUS | RFU2 | D− | D+ | CC2 | VBUS | TX2− | TX2+ | GND |
| B12 | B11 | B10 | B9 | B8 | B7 | B6 | B5 | B4 | B3 | B2 | B1 |

METHOD, APPARATUS, AND COMPUTER PROGRAM PRODUCT FOR ENTERING ACCESSORY DOCKING MODE IN USB TYPE C

FIELD

The embodiments relate to entering an accessory docking mode.

BACKGROUND

Serial and parallel communication interfaces are widely used to establish communication between devices such as a personal computer, mobile terminals, and headsets. Unlike older connection standards such as RS-232 or Parallel port, universal serial bus (USB) ports and cables supply both data and electric power, enabling connected devices needing operating power, to obtain their operating power via the USB cable from a host device.

SUMMARY

Method, apparatus, and computer program product embodiments of the invention are disclosed for entering an accessory docking mode.

According to an example embodiment of the invention, an apparatus comprises:

a first configuration channel input terminal connected to a reference potential;

a second configuration channel input terminal connected through a resistance to the reference potential;

a source voltage input terminal configured to be coupled to an external voltage source; and a switch connected in parallel with the resistance, the switch being connected between the second configuration channel input terminal and the reference potential, the switch having a control node coupled to the source voltage input terminal, the switch being configured to bypass the resistance when a source voltage is received at the source voltage input terminal.

According to an example embodiment of the invention, an apparatus comprises:

wherein the first configuration channel input terminal, second configuration channel input terminal, and source voltage input terminal are terminals in a universal serial bus (USB) connector.

According to an example embodiment of the invention, an apparatus comprises:

wherein the switch is a transistor and the resistance is a resistor.

According to an example embodiment of the invention, an apparatus comprises:

wherein the first configuration channel input terminal and second configuration channel input terminal are terminals in a universal serial bus (USB) type-C device connector that can be plugged into a mating host connector in either an up-side-up or an up-side-down orientation relative to first and second terminals of the host connector, the orientation of the device connector to the host connector being determined by whether the second configuration channel input terminal is plugged into the first or the second terminal of the host connector.

According to an example embodiment of the invention, an apparatus comprises:

wherein the first configuration channel input terminal, second configuration channel input terminal, and source voltage input terminal are terminals in a universal serial bus (USB) type-C device connector that can be plugged into a mating host connector having first and second terminals, to enable the host to conduct an initial test to determine whether the device connector is plugged into the host connector in either an up-side-up or an up-side-down orientation relative to the first and second terminals of the host connector, the orientation of the device connector to the host connector being determined by whether the second configuration channel input terminal is plugged into the first or the second terminal of the host connector, to enable the host to thereafter determine whether the device is of a predetermined type if the second configuration channel input terminal transitions to the reference potential when the source voltage is received at the source voltage input terminal.

According to an example embodiment of the invention, an apparatus comprises:

wherein the predetermined type is an audio headset.

According to an example embodiment of the invention, a method comprises:

enabling, by a device, a host to conduct an initial test to determine whether a connector of the device is plugged into a connector of the host in either an up-side-up or an up-side-down orientation relative to first and second terminals of the host connector, the orientation of the device connector to the host connector being determined by whether a configuration channel input terminal of the device is plugged into the first or the second terminal of the host connector, the configuration channel input terminal being connected through a resistance to a reference potential;

receiving, by the device, a source voltage at a source voltage input terminal; and switching, by the device, the configuration channel input terminal, to bypass the resistance and transition the configuration channel input terminal to the reference potential, when the source voltage is received at the source voltage input terminal.

According to an example embodiment of the invention, a computer program product comprises computer executable program code recorded on a computer readable non-transitory storage medium, the computer executable program code comprising:

code for enabling, by a device, a host to conduct an initial test to determine whether a connector of the device is plugged into a connector of the host in either an up-side-up or an up-side-down orientation relative to first and second terminals of the host connector, the orientation of the device connector to the host connector being determined by whether a configuration channel input terminal of the device is plugged into the first or the second terminal of the host connector, the configuration channel input terminal being connected through a resistance to a reference potential;

code for receiving, by the device, a source voltage at a source voltage input terminal; and code for switching, by the device, the configuration channel input terminal, to bypass the resistance and transition the configuration channel input terminal to the reference potential, when the source voltage is received at the source voltage input terminal.

According to an example embodiment of the invention, an apparatus comprises:

means for enabling a host to conduct an initial test to determine whether a connector of the apparatus is plugged into a connector of the host in either an up-side-up or an up-side-down orientation relative to first and second terminals of the host connector, the orientation of the apparatus connector to the host connector being determined by whether a configuration channel input terminal of the apparatus is plugged into the first or the second terminal of the host connector, the configuration channel input terminal being connected through a resistance to a reference potential;

means for receiving a source voltage at a source voltage input terminal; and means for switching the configuration channel input terminal, to bypass the resistance and transition the configuration channel input terminal to the reference potential, when the source voltage is received at the source voltage input terminal.

According to an example embodiment of the invention, an apparatus comprises:

at least one processor;

at least one memory including computer program code;

the at least one memory and the computer program code configured to, with the at least one processor, cause the apparatus at least to:

enable a host to conduct an initial test to determine whether a connector of the apparatus is plugged into a connector of the host in either an up-side-up or an up-side-down orientation relative to first and second terminals of the host connector, the orientation of the apparatus connector to the host connector being determined by whether a configuration channel input terminal of the apparatus is plugged into the first or the second terminal of the host connector, the configuration channel input terminal being connected through a resistance to a reference potential;

receive a source voltage at a source voltage input terminal; and switch the configuration channel input terminal, to bypass the resistance and transition the configuration channel input terminal to the reference potential, when the source voltage is received at the source voltage input terminal.

According to an example embodiment of the invention, an apparatus comprises:

a universal serial bus (USB) type-C host connector including a first configuration channel terminal, a second configuration channel terminal, and a source voltage output terminal, the host connector configured to be plugged into a mating device or cable connector in either an up-side-up or an up-side-down orientation relative to first and second terminals of the device connector;

a controller being coupled to the first configuration channel terminal and second configuration channel terminal, the controller being configured to determine an orientation of the device or cable connector to the host connector based on whether the first configuration channel terminal or the second configuration channel terminal of the host connector is connected to one of the terminals of the device or cable connector that is connected through a resistance to a reference potential;

the controller being further coupled to the source voltage output terminal, the controller being further configured to cause a source voltage to be output on the source voltage output terminal to a voltage input terminal of the device or cable connector, after the determination that one of the terminals of the device or cable connector is connected through a resistance to a reference potential; and the controller being further configured to determine whether the device is of a predetermined type based on whether the one of the terminals of the device connector transitions to the reference potential in response to the source voltage output on the source voltage output terminal.

According to an example embodiment of the invention, an apparatus comprises:

wherein the first configuration channel terminal, second configuration channel terminal, and source voltage output terminal are terminals in a universal serial bus (USB) connector.

According to an example embodiment of the invention, an apparatus comprises:

wherein the predetermined type is an audio headset.

According to an example embodiment of the invention, a method comprises:

determining by a host, an orientation of a device or cable connector of a device, to a host connector of the host, based on whether a first configuration channel terminal or a second configuration channel terminal of the host connector is connected to a terminal of the device or cable connector that is connected through a resistance to a reference potential;

causing by the host, a source voltage to be output on a source voltage output terminal of the host connector to a voltage input terminal of the device or cable connector, after the determination that a terminal of the device or cable connector is connected through a resistance to a reference potential; and determining by the host, whether the device is of a predetermined type, based on whether the terminal of the device or cable connector transitions to the reference potential in response to the source voltage output on the source voltage output terminal.

According to an example embodiment of the invention, a method comprises:

wherein the predetermined type is an audio headset.

According to an example embodiment of the invention, a computer program product comprises computer executable program code recorded on a computer readable non-transitory storage medium, the computer executable program code comprising:

code for determining by a host, an orientation of a device or cable connector of a device, to a host connector of the host, based on whether a first configuration channel terminal or a second configuration channel terminal of the host connector is connected to a terminal of the device or cable connector that is connected through a resistance to a reference potential;

code for causing by the host, a source voltage to be output on a source voltage output terminal of the host connector to a voltage input terminal of the device or cable connector, after the determination that a terminal of the device or cable connector is connected through a resistance to a reference potential; and code for determining by the host, whether the device is of a predetermined type, based on whether the terminal of the device or cable connector transitions to the reference potential in response to the source voltage output on the source voltage output terminal.

According to an example embodiment of the invention, a computer program product comprises:

wherein the predetermined type is an audio headset.

According to an example embodiment of the invention, an apparatus comprises:

means for determining by the apparatus, an orientation of a device or cable connector of a device, to an apparatus connector of the apparatus, based on whether a first configuration channel terminal or a second configuration channel terminal of the apparatus connector is connected to a terminal of the device or cable connector that is connected through a resistance to a reference potential;

means for causing by the apparatus, a source voltage to be output on a source voltage output terminal of the apparatus connector to a voltage input terminal of the device or cable connector, after the determination that a terminal of the device or cable connector is connected through a resistance to a reference potential; and means for determining by the apparatus, whether the device is of a predetermined type, based on whether the terminal of the device or cable connector transitions to the reference potential in response to the source voltage output on the source voltage output terminal.

According to an example embodiment of the invention, an apparatus comprises:

wherein the predetermined type is an audio headset.

According to an example embodiment of the invention, an apparatus comprises:

at least one processor;

at least one memory including computer program code;

the at least one memory and the computer program code configured to, with the at least one processor, cause the apparatus at least to:

determine an orientation of a device or cable connector of a device, to an apparatus connector of the apparatus, based on whether a first configuration channel terminal or a second configuration channel terminal of the apparatus connector is connected to a terminal of the device or cable connector that is connected through a resistance to a reference potential;

cause a source voltage to be output on a source voltage output terminal of the apparatus connector to a voltage input terminal of the device or cable connector, after the determination that a terminal of the device or cable connector is connected through a resistance to a reference potential; and determine whether the device is of a predetermined type, based on whether the terminal of the device or cable connector transitions to the reference potential in response to the source voltage output on the source voltage output terminal.

According to an example embodiment of the invention, an apparatus comprises:

wherein the predetermined type is an audio headset.

In this manner, embodiments of the invention enable entering an accessory docking mode.

DISCUSSION OF EXAMPLE EMBODIMENTS

A USB system may include a host, a plurality of downstream USB ports, and a plurality of peripheral devices connected in a tiered-star topology. Additional USB hubs may be included in the tiers, allowing branching into a tree structure with up to five tier levels. A USB host may have multiple host controllers and each host controller may provide one or more USB ports. Up to 127 devices, including hub devices, may be connected to a single host controller.

Figure 1A:
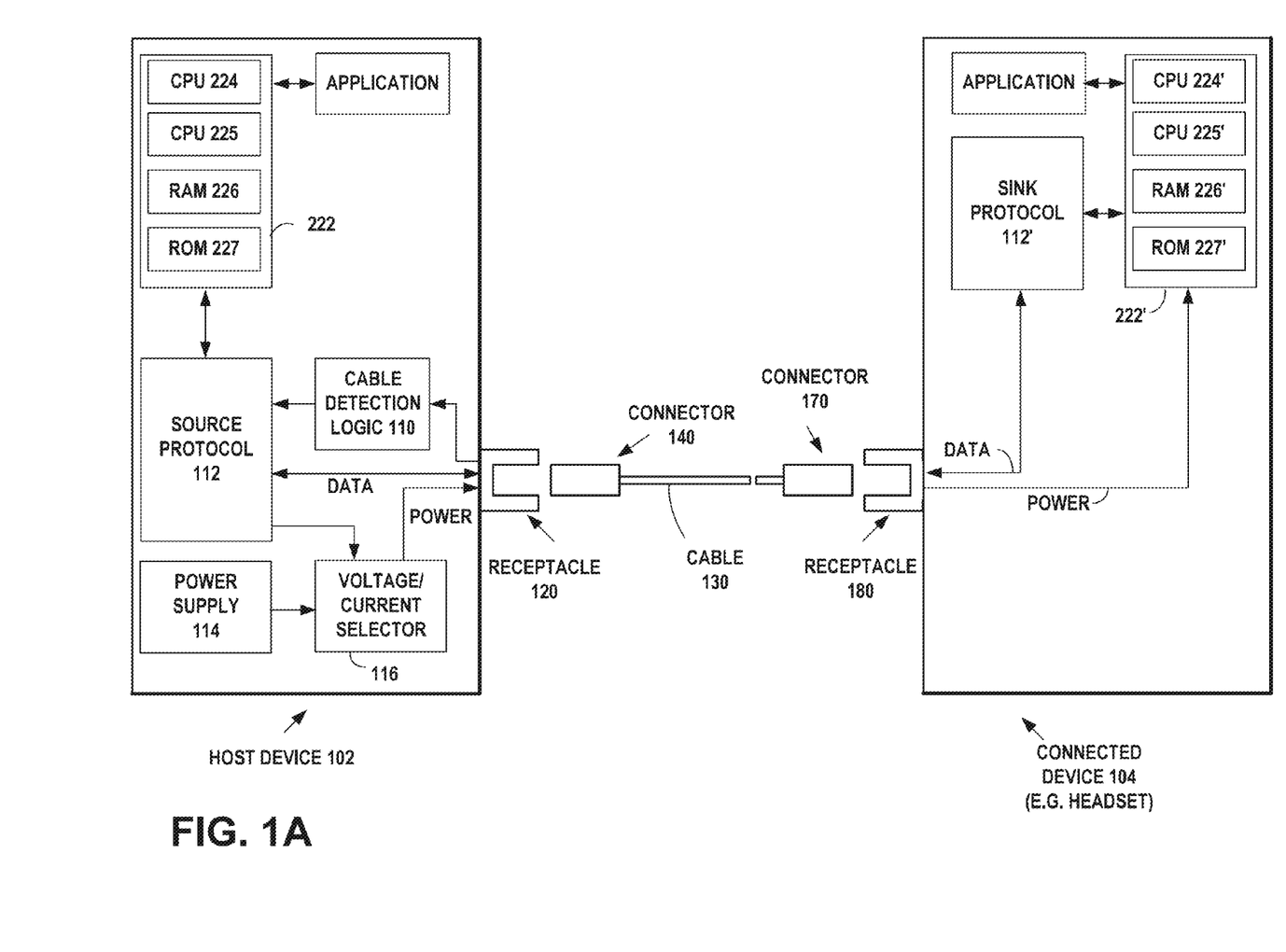
FIG. 1A illustrates an example functional block diagram of a host device and a connected device, such as a headset, to be connected by a USB cable.

FIG. 1A illustrates an example functional block diagram of a host device 102 and a connected device 104, such as a headset, to be connected by a cable 130, such as for example a USB cable. The connector 140, such as a USB Type-C connector, has an example USB Type-C connector pinning shown in FIG. 1B. The host device 102 has a receptacle 120, such as for example a USB type-C receptacle to receive the connector 140 plugged into the receptacle 120.

In accordance with an example embodiment of the invention, the host device 102 may include processing logic 222 that may include one of several central processor units (CPUs) 224 and 225, a random-access memory (RAM) 226, and a read-only memory (ROM) 227. Alternately, processing logic 222 may include programmed logic arrays of sequential and combinatorial logic circuits and state machine logic implementing some or all of the steps performed by embodiments of the invention. The source protocol 112 may be embodied as a programmed sequence of executable instructions stored in the RAM or ROM and executed by the central processor unit (CPU) to carry out the functions of embodiments of the invention.

Figure 1B:
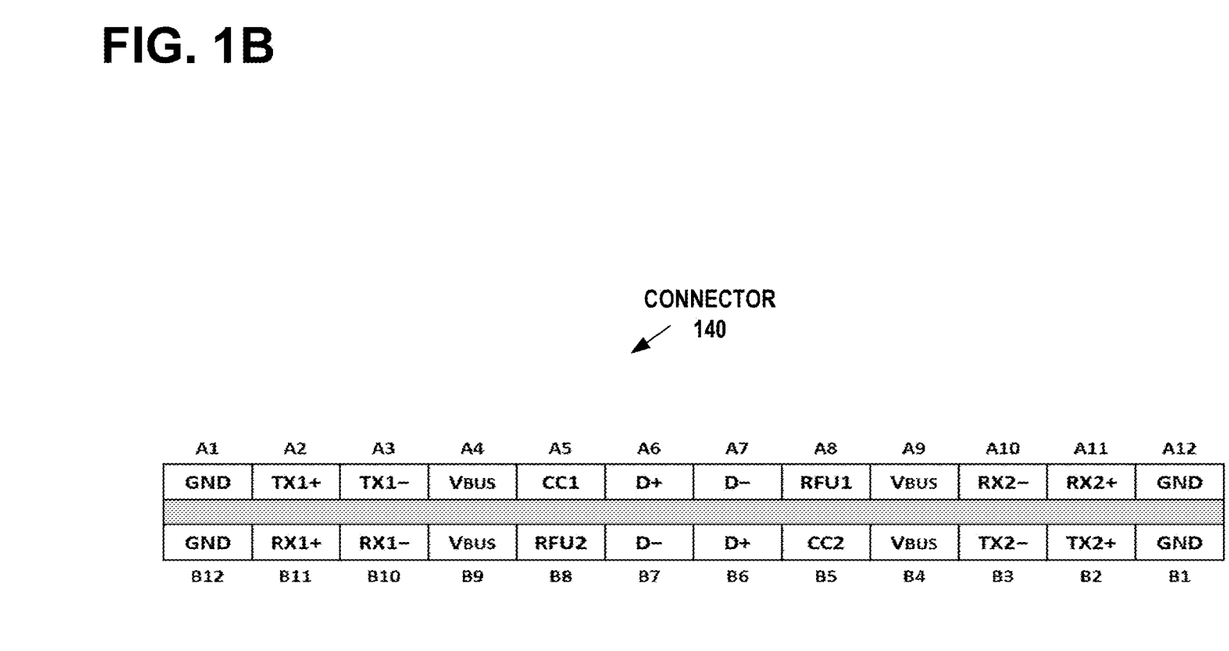
FIG. 1B illustrates an example layout of the USB Type-C connector pinning.

A new USB Type-C connector 140 is an interface supporting the USB 3.0 level of communication. The connector 140 is symmetrical so that it may be plugged in both ways, up-side-up or up-side-down. FIG. 1B shows an example of the pinning of the connector 140. The connector will also be similar for both hosts and devices. The polarity of the plug and host/device role will be configured by a system called Configuration Channel (CC), which will have two pins CC1 and CC2 at each receptacle, but only one of them, CC1, is wired trough the cable from the plugs. Using this feature the host and device sides may figure out which way the plug is inserted in the receptacles.

A new Type-C interface may be used for simple audio headsets that would have the Type-C plug. Connection of this kind of headset to a host or a dual role device must be distinguished from any other cable or plug connection.

Figure 2:
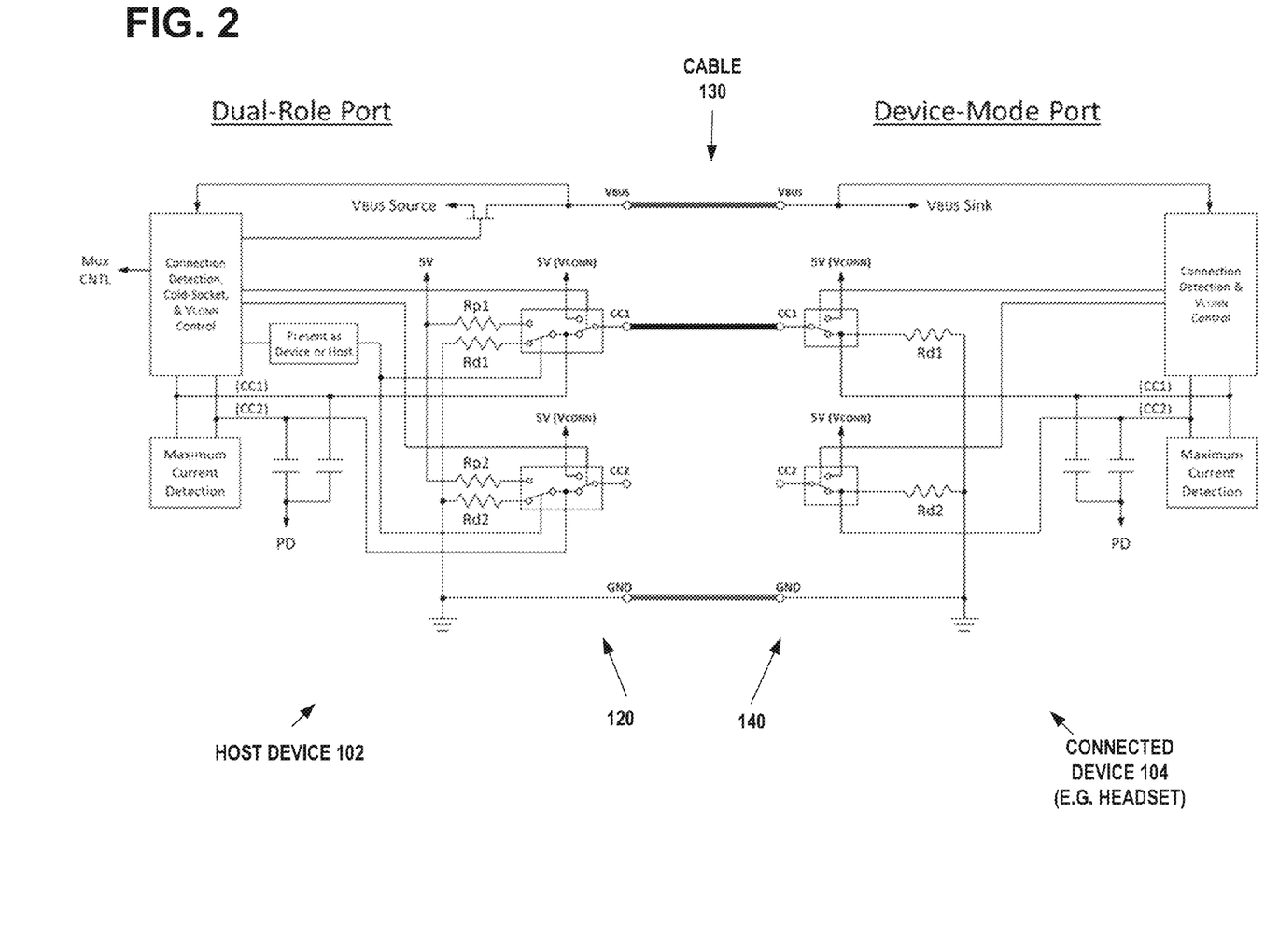
FIG. 2 illustrates an example circuit diagram of the Configuration Channel (CC) pin principle.

Both CC-pins are pulled up in the host side and pulled down in the device side by resistors. When the cable is connected between the host and device, both may monitor both of the CC-pins and see that at both ends only one pin will change its voltage level. Noting which pin this is, the host or device may figure out which way the plug is inserted locally. After the valid connection is detected, a +5 V VCON voltage is applied to the unused CC-pin for possible active cables. The CC-pin principle is shown in FIG. 2.

Some devices may not have a receptacle for receiving a cable plug, but they may be instead equipped with a captive cable that is permanently attached to the device. Alternatively, the device may be a docking station without a cable. In both cases the host and the device are connected together without a separate cable so there are only two possible ways to connect the device to the host. An example of a device with captive cable is an audio headset, which is plugged to phone's USB Type C receptacle.

One way of distinguishing the audio headset from normal USB Type C devices would be to connect one CC-pin (CC1) permanently to ground. This would result in a 0V voltage level at the host CC-pin and this could be seen as different from a valid connection to a normal USB Type C device, where the voltage level at Host's CC pin would be higher (due to presence of Rd1).

However, the active cable supply voltage makes things more complicated, since the active cable supply voltage is connected to CC2 pin of the cable plug. When this kind of cable is connected to a host, the CC1 pin is pulled down normally to a detectable voltage and the CC2 pin may be pulled almost to ground depending on the load in the VCON. Still the host may see that a valid connection happens and may ignore the down pulled CC-pin for a while and connect the +5V VCON supply to that pin.

What is needed is a way for a USB host to distinguish the headset from an active cable and still retain the polarity information via the CC-pins. The problem to mix an active cable with an audio headset comes, when an active cable with the other end unconnected is plugged to a host. Then only the CC-pin, where the VCON supply is connected within the active cable is pulled down to almost 0V. This would be similar condition as an audio headset with one CC-pin connected to ground. One solution would be to connect both CC-pins in the audio headset to ground. This solves nicely the problem of mixing it with un-ended active cable, but at the same time we lose the information which way the audio headset is plugged to the host as both CC-pin behave exactly similar way. Not having the polarity information means that the polarity of the signals from the audio headset must be detected by other ways.

In accordance with an example embodiment of the invention, it is possible to distinguish the headset from an active cable and still retain the polarity information via the CC-pins. The method is to connect only one CC-pin (CC2) permanently to ground in the headset. The other CC-pin is connected to ground via a normal value pull down resistor. The resistor may, however, be short circuited with a switch (transistor), which is controlled by the VBUS-voltage from the host.

When this kind of headset is connected to a host, it sees that a valid connection is done and turns on the VBUS voltage and also VCON to the unused CC-pin. The unused CC-pin is grounded in the headset, so this will not lead to anywhere, but the VBUS voltage will in the headset turn the short circuit switch on and pull also this CC-pin down. This may be detected by the host and it may thus recognize that an audio headset, or in general a device of a predetermined type, is connected. The host may also detect the plug polarity from the CC-pin. So, in short also in the invention both CC-pins will be grounded in the headset so that it may be distinguished from an active cable, but not immediately so that the polarity may be first detected.

Figure 3:
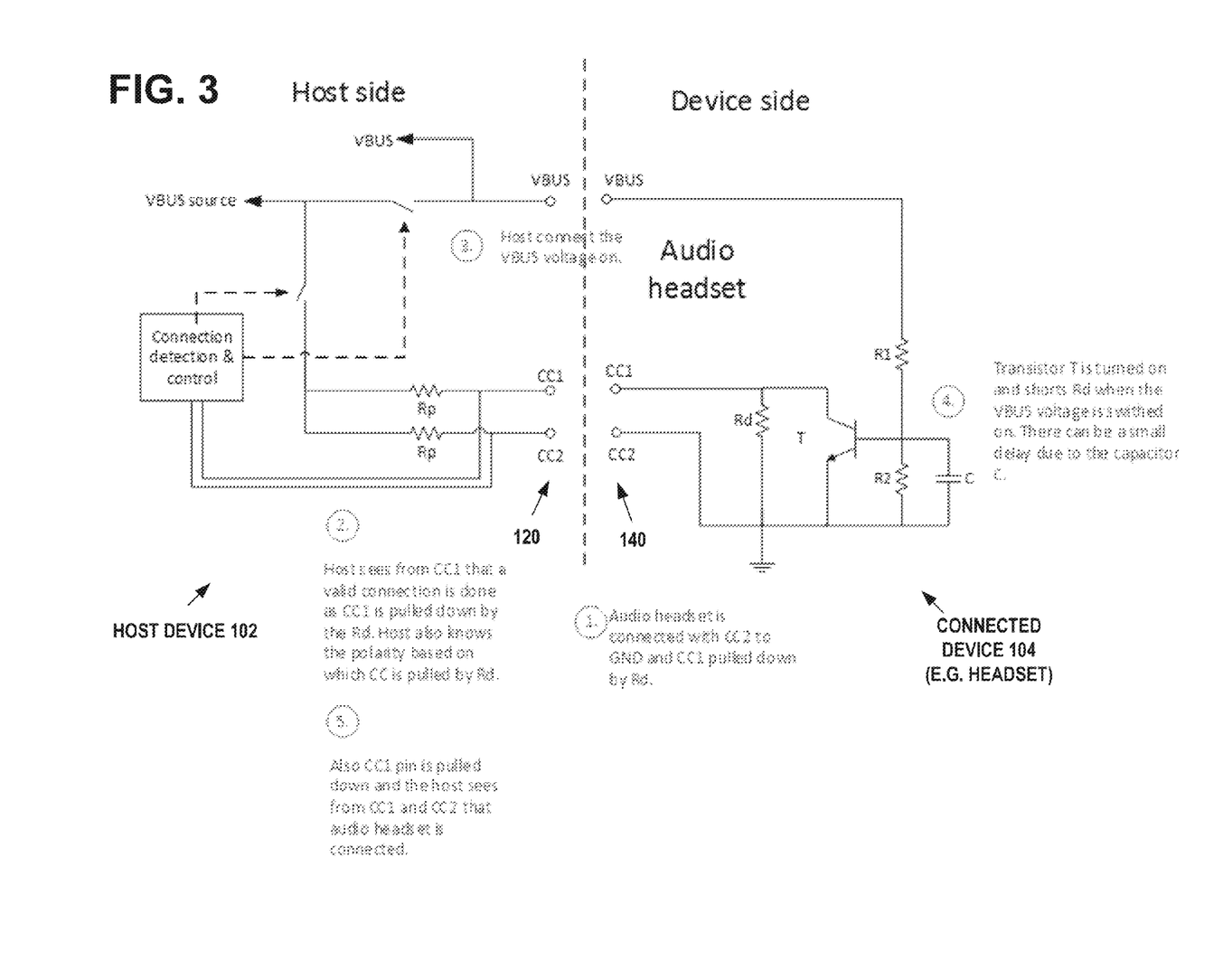
FIG. 3 illustrates an example circuit diagram for identifying an audio headset using USB Type-C connector pinning, in accordance with an embodiment of the invention.

FIG. 3 illustrates an example embodiment for identifying an audio headset 104 using USB Type-C connector pinning, in accordance with an embodiment of the invention. In the headset 104, CC2 pin is grounded directly and CC1 pin via the pull down resistor Rd. Transistor T is not conducting as there is no voltage at the VBUS. When the headset 104 is plugged in, the host 102 (or a dual role device in host mode) will see that CC1 (or in case of inverted plug CC2) is pulled down through a resistance indicating normal connection. The host also notes that CC2 is pulled down directly to GND. Form CC1 the host knows which way around the plug is connected. Next the host will turn VBUS on. This will cause transistor T becoming conducting in the headset and shorting the Rd. This may not happen immediately, a small delay can be caused by capacitor C. Now the CC1 will also go to GND on the host side and the host can deduce that an audio headset is connected as both CC-lines are pulled down to hard GND. Alternatively, the host may deduce that an audio headset is connected by detecting that CC1 or CC2 is first connected to GND through a resistance and after turning VBUS on the same CC pin is connected to GND without the resistance.

Figure 4A:
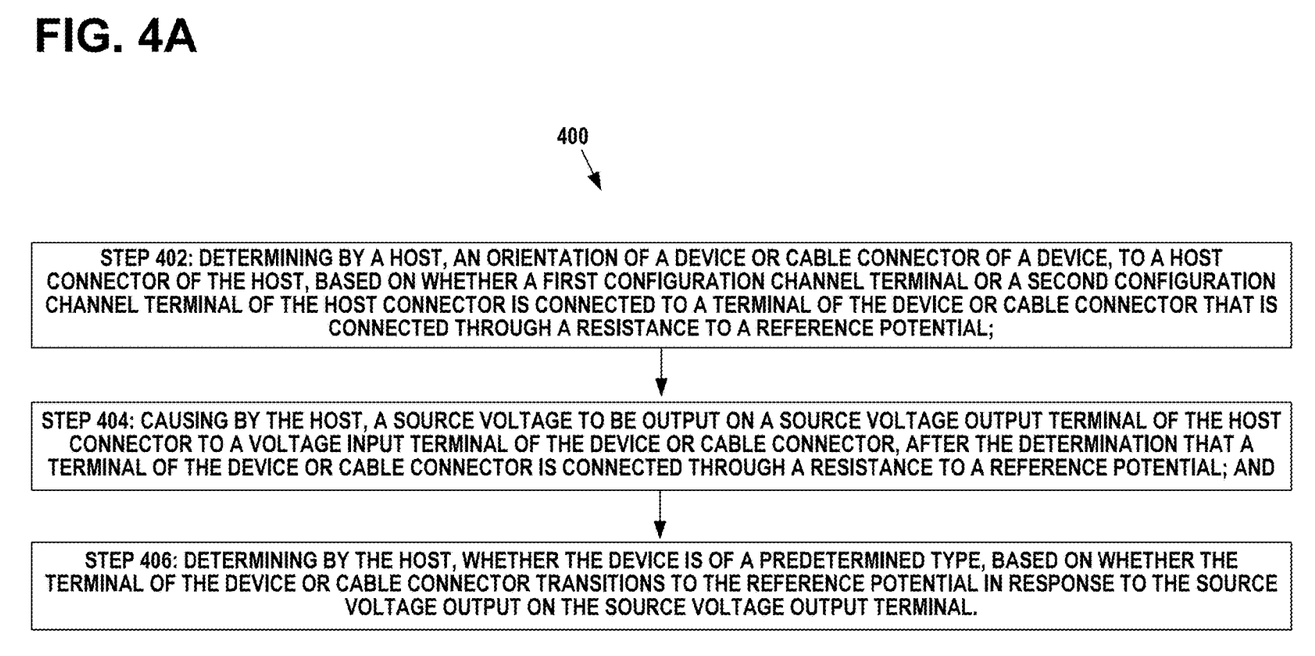
FIG. 4A is an example flow diagram of operational steps of the host device identifying an audio headset using USB Type-C connector pinning, in accordance with an embodiment of the invention.

FIG. 4A is an example flow diagram 400 of operational steps of the host device 102 identifying an audio headset 104 using USB Type-C connector pinning, in accordance with at least one embodiment of the present invention. The steps of the flow diagram represent computer code instructions stored in the RAM and/or ROM memory, which when executed by the central processing units (CPU) CPU 224 and/or CPU 225, carry out the functions of the example embodiments of the invention. The steps may be carried out in another order than shown and individual steps may be combined or separated into component steps. The flow diagram has the following steps:

Step 402: determining by a host, an orientation of a device or cable connector of a device, to a host connector of the host, based on whether a first configuration channel terminal or a second configuration channel terminal of the host connector is connected to a terminal of the device or cable connector that is connected through a resistance to a reference potential;

Step 404: causing by the host, a source voltage to be output on a source voltage output terminal of the host connector to a voltage input terminal of the device or cable connector, after the determination that a terminal of the device or cable connector is connected through a resistance to a reference potential; and Step 406: determining by the host, whether the device is of a predetermined type, based on whether the terminal of the device or cable connector transitions to the reference potential in response to the source voltage output on the source voltage output terminal.

Figure 4B:
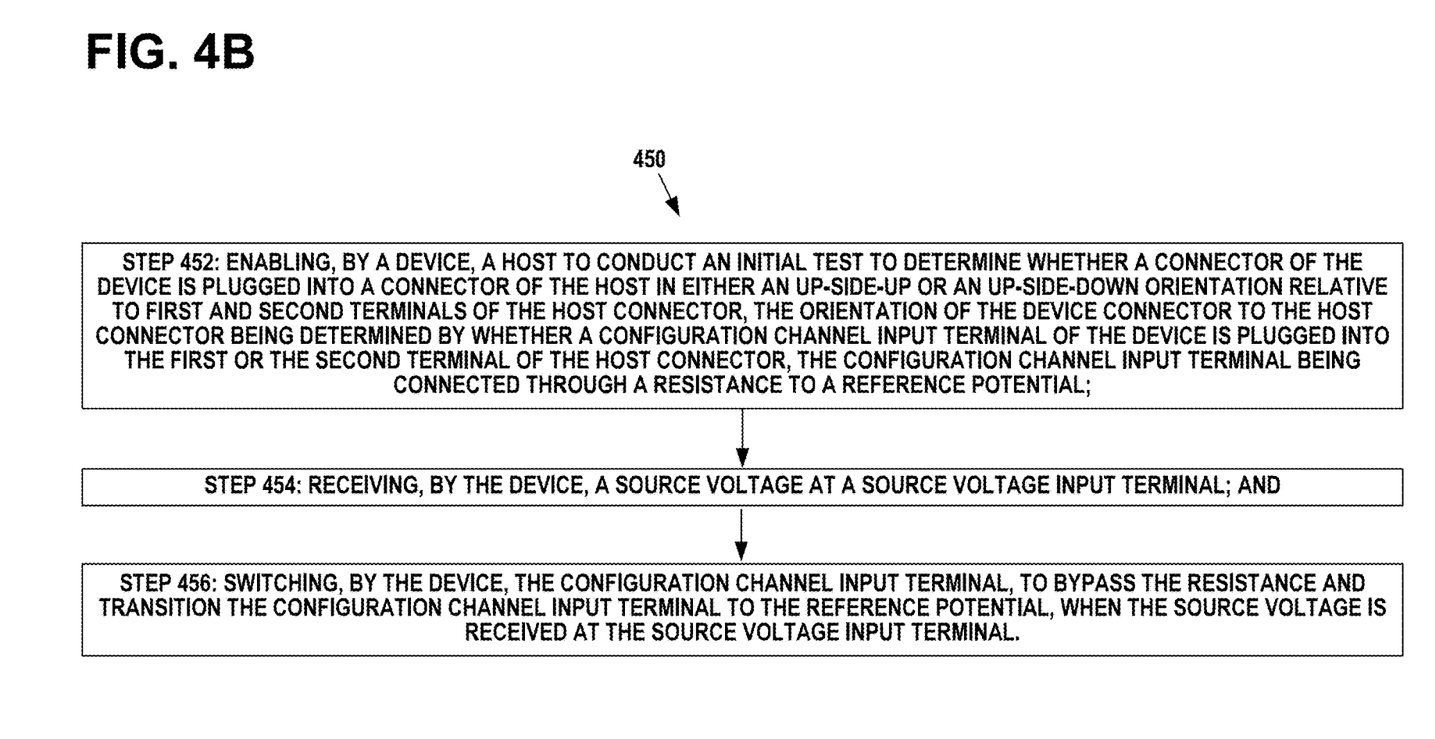
FIG. 4B is an example flow diagram of operational steps of the device, such as an audio headset, using USB Type-C connector pinning, in accordance with at least one embodiment of the present invention.

FIG. 4B is an example flow diagram 450 of operational steps of the device 104, such as an audio headset 104, using USB Type-C connector pinning, in accordance with at least one embodiment of the present invention. The steps of the flow diagram represent computer code instructions stored in the RAM and/or ROM memory, which when executed by the central processing units (CPU) CPU 224' and/or CPU 225', carry out the functions of the example embodiments of the invention. The steps may be carried out in another order than shown and individual steps may be combined or separated into component steps. The flow diagram has the following steps:

Step 452: enabling, by a device, a host to conduct an initial test to determine whether a connector of the device is plugged into a connector of the host in either an up-side-up or an up-side-down orientation relative to first and second terminals of the host connector, the orientation of the device connector to the host connector being determined by whether a configuration channel input terminal of the device is plugged into the first or the second terminal of the host connector, the configuration channel input terminal being connected through a resistance to a reference potential;

Step 454: receiving, by the device, a source voltage at a source voltage input terminal; and Step 456: switching, by the device, the configuration channel input terminal, to bypass the resistance and transition the configuration channel input terminal to the reference potential, when the source voltage is received at the source voltage input terminal.

Using the description provided herein, the embodiments may be implemented as a machine, process, or article of manufacture by using standard programming and/or engineering techniques to produce programming software, firmware, hardware or any combination thereof.

Some or all of the steps in the flow diagrams disclosed herein may be embodied as hardware program logic included in programmed logic arrays of sequential and/or combinatorial logic circuits and/or state machine logic implementing some or all of the steps performed by embodiments of the invention.

Any resulting program(s), having computer-readable program code, may be embodied on one or more computer-usable non-transitory media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A universal serial bus connector, comprising:
   a first configuration channel input terminal connected to a reference potential;
   a second configuration channel input terminal connected through a resistance to the reference potential;
   a source voltage input terminal configured to be coupled to an external voltage source; and
   a switch connected in parallel with the resistance, the switch being connected between the second configuration channel input terminal and the reference potential, the switch having a control node coupled to the source voltage input terminal, the switch being configured to bypass the resistance when a source voltage is received at the source voltage input terminal.

2. The universal serial bus connector of claim 1, wherein the first configuration channel input terminal, second configuration channel input terminal, and source voltage input terminal are terminals in the universal serial bus (USB) connector.

3. The universal serial bus connector of claim 1, wherein the switch is a transistor and the resistance is a resistor.

4. The universal serial bus connector of claim 1, wherein the first configuration channel input terminal and second configuration channel input terminal are terminals in a universal serial bus (USB) type-C device connector that can be plugged into a mating host connector in either an up-side-up or an up-side-down orientation relative to first and second terminals of the host connector, the orientation of the device connector to the host connector being determined by whether the second configuration channel input terminal is plugged into the first or the second terminal of the host connector.

5. The universal serial bus connector of claim 1, wherein the first configuration channel input terminal, second configuration channel input terminal, and source voltage input terminal are terminals in a universal serial bus (USB) type-C device connector that can be plugged into a mating host connector having first and second terminals, to enable the host to conduct an initial test to determine whether the device connector is plugged into the host connector in either an up-side-up or an up-side-down orientation relative to the first and second terminals of the host connector, the orientation of the device connector to the host connector being determined by whether the second configuration channel input terminal is plugged into the first or the second terminal of the host connector, to enable the host to thereafter determine whether the device is of a predetermined type if the second configuration channel input terminal transitions to the reference potential when the source voltage is received at the source voltage input terminal.

6. The universal serial bus connector of claim 5, wherein the predetermined type is an audio headset.

7. A method, comprising:
   enabling, by a device, a host to conduct an initial test to determine whether a universal serial bus connector of the device is plugged into a connector of the host in either an up-side-up or an up-side-down orientation relative to first and second terminals of the host connector, the orientation of the device connector to the host connector being determined by whether a configuration channel input terminal of the device is plugged into the first or the second terminal of the host connector, the configuration channel input terminal being connected through a resistance to a reference potential;
   receiving, by the device, a source voltage at a source voltage input terminal; and
   switching, by the device, the configuration channel input terminal, to bypass the resistance and transition the configuration channel input terminal to the reference potential, when the source voltage is received at the source voltage input terminal.

8. A computer program product comprising computer executable program code recorded on a computer readable non-transitory storage medium, the computer executable program code comprising:
   code for enabling, by a device, a host to conduct an initial test to determine whether a universal serial bus connector of the device is plugged into a connector of the host in either an up-side-up or an up-side-down orientation relative to first and second terminals of the host connector, the orientation of the device connector to the host connector being determined by whether a configuration channel input terminal of the device is plugged into the first or the second terminal of the host connector, the configuration channel input terminal being connected through a resistance to a reference potential;
   code for receiving, by the device, a source voltage at a source voltage input terminal; and
   code for switching, by the device, the configuration channel input terminal, to bypass the resistance and transition the configuration channel input terminal to the reference potential, when the source voltage is received at the source voltage input terminal.

9. An apparatus, comprising:
   at least one processor;
   at least one memory including computer program code;
   the at least one memory and the computer program code configured to, with the at least one processor, cause the apparatus at least to:
   enable a host to conduct an initial test to determine whether a universal serial bus connector of the apparatus is plugged into a connector of the host in either an up-side-up or an up-side-down orientation relative to first and second terminals of the host connector, the orientation of the apparatus connector to the host connector being determined by whether a configuration channel input terminal of the apparatus is plugged into the first or the second terminal of the host connector, the configuration channel input terminal being connected through a resistance to a reference potential;

receive a source voltage at a source voltage input terminal; and switch the configuration channel input terminal, to bypass the resistance and transition the configuration channel input terminal to the reference potential, when the source voltage is received at the source voltage input terminal.

10. A host device, comprising:
a universal serial bus (USB) type-C host connector including a first configuration channel terminal, a second configuration channel terminal, and a source voltage output terminal, the host connector configured to be plugged into a mating device or cable connector in either an up-side-up or an up-side-down orientation relative to first and second terminals of the device connector;

a controller being coupled to the first configuration channel terminal and second configuration channel terminal, the controller being configured to determine an orientation of the device or cable connector to the host connector based on whether the first configuration channel terminal or the second configuration channel terminal of the host connector is connected to one of the terminals of the device or cable connector that is connected through a resistance to a reference potential;

the controller being further coupled to the source voltage output terminal, the controller being further configured to cause a source voltage to be output on the source voltage output terminal to a voltage input terminal of the device or cable connector, after the determination that one of the terminals of the device or cable connector is connected through a resistance to a reference potential; and the controller being further configured to determine whether the device is of a predetermined type based on whether the one of the terminals of the device connector transitions to the reference potential in response to the source voltage output on the source voltage output terminal.

11. The host device of claim 10, wherein the first configuration channel terminal, second configuration channel terminal, and source voltage output terminal are terminals in a universal serial bus (USB) connector.

12. The host device of claim 10, wherein the predetermined type is an audio headset.

13. A method, comprising:
determining by a host, an orientation of a device or cable universal serial bus connector of a device, to a host connector of the host, based on whether a first configuration channel terminal or a second configuration channel terminal of the host connector is connected to a terminal of the device or cable connector that is connected through a resistance to a reference potential;

causing by the host, a source voltage to be output on a source voltage output terminal of the host connector to a voltage input terminal of the device or cable connector, after the determination that a terminal of the device or cable connector is connected through a resistance to a reference potential; and determining by the host, whether the device is of a predetermined type, based on whether the terminal of the device or cable connector transitions to the reference potential in response to the source voltage output on the source voltage output terminal.

14. The method of claim 13, wherein the predetermined type is an audio headset.

15. A computer program product comprising computer executable program code recorded on a computer readable non-transitory storage medium, the computer executable program code comprising:
code for determining by a host, an orientation of a device or cable universal serial bus connector of a device, to a host connector of the host, based on whether a first configuration channel terminal or a second configuration channel terminal of the host connector is connected to a terminal of the device or cable connector that is connected through a resistance to a reference potential;

code for causing by the host, a source voltage to be output on a source voltage output terminal of the host connector to a voltage input terminal of the device or cable connector, after the determination that a terminal of the device or cable connector is connected through a resistance to a reference potential; and code for determining by the host, whether the device is of a predetermined type, based on whether the terminal of the device or cable connector transitions to the reference potential in response to the source voltage output on the source voltage output terminal.

16. The computer program product of claim 15, wherein the predetermined type is an audio headset.

17. An apparatus, comprising:
at least one processor;
at least one memory including computer program code;
the at least one memory and the computer program code configured to, with the at least one processor, cause the apparatus at least to:
determine an orientation of a device or cable universal serial bus connector of a device, to an apparatus connector of the apparatus, based on whether a first configuration channel terminal or a second configuration channel terminal of the apparatus connector is connected to a terminal of the device or cable connector that is connected through a resistance to a reference potential;

cause a source voltage to be output on a source voltage output terminal of the apparatus connector to a voltage input terminal of the device or cable connector, after the determination that a terminal of the device or cable connector is connected through a resistance to a reference potential; and determine whether the device is of a predetermined type, based on whether the terminal of the device or cable connector transitions to the reference potential in response to the source voltage output on the source voltage output terminal.

18. The apparatus of claim 17, wherein the predetermined type is an audio headset.

* * * * *